United States Patent [19]

Vassiliou

[11] 4,054,705
[45] Oct. 18, 1977

[54] PROCESS FOR DECORATING COATINGS PRODUCED BY HEAT-STABLE POLYMER COMPOSITIONS

[75] Inventor: Eustathios Vassiliou, Newark, Del.

[73] Assignee: E. I. Du Pont de Nemours and Company, Wilmington, Del.

[21] Appl. No.: 677,988

[22] Filed: Apr. 19, 1976

Related U.S. Application Data

[63] Continuation-in-part of Ser. No. 606,296, Aug. 22, 1975, abandoned, Ser. No. 606,297, Aug. 22, 1975, abandoned, Ser. No. 606,298, Aug. 22, 1975, abandoned, and Ser. No. 606,299, Aug. 22, 1975, said Ser. No. 606,296, is a continuation-in-part of Ser. No. 552,872, Feb. 25, 1975, abandoned, which is a continuation-in-part of Ser. No. 509,936, Sept. 27, 1974, abandoned, said Ser. No. 606,297, is a continuation-in-part of Ser. No. 552,871, Feb. 25, 1975, abandoned, which is a continuation-in-part of Ser. No. 509,939, Sept. 27, 1974, abandoned, said Ser. No. 606,298, is a continuation-in-part of Ser. No. 552,870, Feb. 22, 1975, abandoned, which is a continuation-in-part of Ser. No. 509,938, Sept. 27, 1974, abandoned, said Ser. No. 606,299, is a continuation-in-part of Ser. No. 552,873, Feb. 25, 1975, abandoned, which is a continuation-in-part of Ser. No. 509,937, Sept. 27, 1974, abandoned.

[51] Int. Cl.² .................. B32B 3/10; B32B 27/00; B05D 3/02

[52] U.S. Cl. .................. 428/201; 427/145; 427/258; 427/261; 427/228; 427/302; 427/333; 427/340; 427/341; 427/385 B; 427/385 A; 427/385 R; 427/388 R; 427/399; 427/400; 428/199; 428/204; 428/207; 428/209; 428/203; 428/411; 428/419; 428/420; 428/422; 428/426; 428/432; 428/435; 428/457; 428/458; 428/470; 428/474

[58] Field of Search .......... 428/422, 470, 913, 420, 428/199, 201, 209, 207, 203, 204, 411, 419, 457, 458, 474, 476, 432, 435; 427/400, 399, 302, 228, 256, 258, 261, 387, 340, 341, 388 R, 385 B, 385 R, 385 A, 145, 333

[56] References Cited

U.S. PATENT DOCUMENTS

| | | | |
|---|---|---|---|
| 2,681,324 | 6/1954 | Hochberg | 428/422 |
| 2,866,765 | 12/1958 | Smith | 428/422 |
| 2,961,341 | 11/1960 | Long | 428/422 |
| 2,979,418 | 4/1961 | Dipner | 428/422 |
| 3,293,203 | 12/1966 | Paulis | 260/42.27 |
| 3,473,949 | 10/1969 | Eldred | 427/302 |
| 3,489,595 | 1/1970 | Brown | 428/422 |
| 3,493,418 | 2/1970 | Amano | 428/407 |
| 3,577,257 | 5/1971 | Hutzler | 427/333 |
| 3,692,558 | 9/1972 | Werner | 428/422 |

Primary Examiner—Ellis Robinson

[57] ABSTRACT

The appearance of a heat-stable polymer coating is enhanced by a process which produces a decorative pattern within a coating produced by a heat-stable polymer coating composition. The process consists of applying a heat-stable polymer composition as a subsequent coat over or directly under an antioxidant composition and an oxidation catalyst composition which are both arranged in decorative patterns and which diffuse into the heat-stable polymer coating composition and render the patterns visible, upon baking, within the baked coat produced by the coating composition.

17 Claims, No Drawings

PROCESS FOR DECORATING COATINGS PRODUCED BY HEAT-STABLE POLYMER COMPOSITIONS

CROSS-REFERENCE TO RELATED APPLICATIONS

This application is a continuation-in-part of copending application Ser. No. 606,298, filed 8/22/75, now abandoned which is a continuation-in-part of application Ser. No. 552,870, filed 2/22/75, now abandoned which is a continuation-in-part of application Ser. No. 509,938, filed 9/27/74, now abandoned; a continuation-in-part of copending application Ser. No. 606,297, filed 8/22/75 now abandoned which is a continuation-in-part of application Ser. No. 552,871, filed 2/25/75, now abandoned, which is a continuation-in-part of application Ser. No. 509,939, filed 9/27/74, now abandoned; a continuation-in-part of copending application Ser. No. 606,299, filed 8/22/75 which is a continuation-in-part of application Ser. No. 552,873, filed 2/25/75, now abandoned, which is a continuation-in-part of Ser. No. 509,937, filed 9/27/74, now abandoned; and a continuation-in-part of copending application Ser. No. 606,296, filed 8/22/75, which is a continuation-in-part of application Ser. No. 552,872, filed 2/25/75, now abandoned, which is a continuation-in-part of application Ser. No. 509,936, filed 9/27/74, now abandoned.

BACKGROUND OF THE INVENTION

1. Field of the Invention

This invention relates to a process which renders decorative patterns visible within a coating produced by a heat-stable polymer coating composition.

2. Prior Art

Articles coated with heat-stable polymer compositions of various types have come into widespread use in recent years. Heat-stable polymer coated articles are useful for purposes requiring or aided by a heat-stable surface. Especially useful are heat-stable polymer coating compositions which provide lubricious surfaces. The uses of coated articles having lubricious surfaces range from bearings to ship bottoms and from iron soleplates to ice cube trays.

To achieve maximum consumer demand for an article consumer expectations must be met. One consumer expectation is to have a product which is pleasing to his or her aesthetic sense and which is capable of maintaining this pleasing effect throughout the product's useful life.

The process of this invention produces decorative patterns visible within a coating produced by a heat-stable polymer coating composition, thereby achieving this consumer expectation. By decorative pattern is meant any image, picture, design, configuration, or illustration, whether random or predetermined, which can be formed by any conventional method of applying ink.

Decorative areas of the coating wear as well as nondecorative areas for the following reasons. The decorative patterns extend through the entire thickness of the coating; therefor, as the coating is worn thinner the decorative patterns are still present. Concentration of heat-stable polymer is uniform throughout the coating, i.e., the decorative and nondecorative areas; therefore, the coating has uniform heat stability throughout. Thickness of the coating is uniform, i.e., neither the decorative nor nondecorative areas are higher than the other, thereby not facilitating chipping of a higher area.

SUMMARY OF THE INVENTION

According to the present invention there is provided a process which renders decorative patterns visible within a baked coating produced by a heat-stable polymer coating composition. The process consists essentially of applying the heat-stable polymer coating composition either as a subsequent coat over or directly under an antioxidant composition and an oxidation catalyst composition which are both arranged in decorative patterns, wherein the antioxidant or its decomposition products and the oxidation catalyst or its decomposition products diffuse into the coating and either by reacting with components of the coating, by catalyzing reactions within the coating or by themselves render, upon baking, the decorative patterns visible within the coating produced by the heat-stable coating composition.

DETAILED DESCRIPTION OF THE INVENTION

A heat-stable polymer composition consists of at least one heat-stable polymer and a liquid carrier.

A heat-stable polymer is a polymer which is not affected by temperatures above 300° C which would decompose, oxidize or otherwise adversely affect most organic compounds. Some examples of heat-stable polymers are silicones, polysulfides, polymerized parahydroxy benzoic acid, polysulfones, polyimides, polyamides, polysulfonates, polysulfonamides, H-resins (sold by Hercules Corporation), and fluorocarbons. One or more heat-stable polymer can be present in the composition of this invention.

The preferred heat-stable polymers are fluorocarbons because of their high temperature stability and release properties. The fluorocarbon polymers used are those of hydrocarbon monomers completely substituted with fluorine atoms or a combination of fluorine and chlorine atoms. Included in this group are perfluoroolefin polymers such as polytetrafluoroethylene (PTFE) and copolymers of tetrafluoroethylene and hexafluoropropylene in all monomer unit weight ratios, fluorochlorocarbon polymers such as polymonochlorotrifluoroethylene, and copolymers of tetrafluoroethylene and perfluoroalkyl vinyl ethers. Mixtures of these can also be used.

The heat-stable polymer is ordinarily present in the composition at a concentration of 25% through 95%, preferably 70% through 90%, by weight of the total solids present in the composition.

Although a dry flour or powder of a heat-stable polymer can be used and a liquid carrier provided separately, a polymer in the form of an aqueous surfactant-stabilized dispersion is preferred for its stability and because it is most easily obtained in that form. Dispersions of heat-stable polymers in organic liquids such as alcohols, ketones, aliphatics or aromatic hydrocarbons, or mixtures of these, can also be used. In either case, the liquid generally serves as the carrier for the composition.

If desired a colorant may be present in the heat-stable polymer composition. A colorant is any compound which changes color when oxidized. Carbon and carbonaceous residues are examples of colorants.

For the purpose of this invention a reaction such as oxidation of carbon black to carbon dioxide in which a solid is oxidized to a fugitive gas, the solid thereby vanishing from the composition, is considered a color change.

Carbon can be present in concentrations up to 40% based on the weight of total solids of the composition, preferably in concentrations of 0.5-10%.

Carbonaceous residues are produced by decomposition or partial oxidation of organic compounds, which includes organometallic compounds. Organic compounds are normally present in coating compositions to serve as dispersants, coalescing agents, viscosity builders, etc. or they can be added to serve as colorants.

Although absolute amounts of carbonaceous residues in the heat-stable polymer coating are usually extremely small, nevertheless, they give a definite coloration to a baked coating.

Examples of organic compounds which produce carbonaceous residues are polymers of ethylenically unsaturated monomers, which depolymerize, and whose depolymerization products vaporize, in the temperature range of from 150° C below the fusion temperature to about the heat-stable polymer's decomposition temperature.

"Depolymerization" means degradation of a polymer to the point at which the degradation products are volatile at the temperatures encountered in curing the coat. The degradation products can be monomers, dimers or oligomers.

"Vaporize" means volatilization of the degradation products and their evaporation from the film.

Usually the polymers of ethylenically unsaturated monomers contain one or more monoethylenically unsaturated acid units.

Representative of these ethylenically unsaturated monomers are alkyl acrylates and methacrylates having 1 to 8 carbon atoms in the alkyl group, styrene, 2-methyl styrene, vinyl toluene and glycidyl esters of 4 to 14 carbon atoms.

Representative of the monoethylenically unsaturated acids are acrylic acid, methacrylic acid, fumaric acid, itaconic acid and maleic acid (or anhydride).

The polymer of an ethylenically unsaturated monomer which produces a carbonaceous residue can be present as a coalescing agent in the composition at a concentration of about 3% through 60% by weight of total heat-stable polymer and residue producing polymer.

The heat-stable polymer composition can be pigmented or unpigmented. Any pigment or combination of pigments ordinarily used in this sort of composition can be used. Typical of these pigments are titanium dioxide, aluminum oxide, silica, cobalt oxide, iron oxide, etc. The total amount of pigment ordinarily present is at concentrations of up to 40% by weight of the total solids in the composition.

The heat-stable polymer composition can obtain mica particles, mica particles coated with pigment, and glass and metal flakes. These particles and flakes have an average longest dimension of 10 to 100 microns, preferably 15-50 microns, with no particles of flakes having a longest dimension of more than about 200 microns. Particle and flake size is measured optically against a standard.

The mica particles coated with pigment preferred for use are those described in U.S. Pat. No. 3,087,827 granted to Klenke and Stratton, and U.S. Pat. Nos. 3,087,828 and 3,087,829 granted to Linton. The disclosures of these patents are incorporated into this specification to describe the various coated micas and how they are prepared.

The mica particles described in these patents are coated with oxides or hydrous oxides of titanium, zirconium, aluminum, zinc, antimony, tin, iron, copper, nickel, cobalt, chromium, or vanadium. Titanium dioxide coated mica is preferred because of its availability. Mixtures of coated micas can also be used.

Representative of metal flake which can be used are aluminum flake, stainless steel flake, nickel flake, and bronze flake. Mixtures of flake can also be used.

The mica particles, coated mica particles, or glass and metal flake are ordinarily present in coating (and primer) compositions at a concentration of about 0.2-20% by weight of total solids.

The composition can also contain such conventional additives as flow control agents, surfactants, plasticizers, coalescing agents, etc., as seem necessary or desirable. These additives are added for reasons, in ways and in amounts known to artisans.

The amount of total solids in the composition will be governed by the substrate to which the composition is to be applied, method of application, curing procedure, and like factors. Ordinarily, the composition will contain 10% through 80% by weight of total solids, but preferably 30%-50%.

The antioxidant composition must include one or more antioxidant compound and a suitable carrier and can include color enhancers, viscosity builders or thickeners, wetting agents, pigments, decomposable resins and polymers, heat-stable resins and polymers, neutralizers, liquid carriers, and other adjuncts.

Color enhancers are heat-unstable organic compounds which decompose to produce colorants thus enhancing the contrast between decorative pattern and background. Examples of color enchancers are sugar, styrene, starch, fatty acid, and glycerides.

Polytetrafluoroethylene and other heat-stable polymers are examples of viscosity builders or thickeners. Preferably the same heat-stable polymer utilized in the coating composition is utilized as the viscosity builder or thickener.

Examples of pigment are carbon black, iron oxide, cobalt oxide and titanium dioxide. When pigment is present in the antioxidant composition, at least an equal amount, preferably three to ten times as much, of heat-stable polymer will, preferably, also be present.

An antioxidant is any compound that opposes oxidation under fabrication baking condition which are required for manufacture of heat-stable polymer coated articles. The antioxidant can oppose oxidation either by itself or through its decomposition or oxidation products. Preferably, these compounds should yield at least 0.01 parts by weight, based on solids and expressed as the acid, of the corresponding free acids or anhydrides when the compound is decomposed and/or oxidized during fabrication baking. The preferred yield range is 0.1 to 1 part by weight.

Preferred antioxidants are compounds containing phosphorus, sulfur, boron or any combination of the above. The most common examples include the ortho-, meta-, pyro-, acids; neutral and basic salts; esters and generally their organic derivatives including organometallic derivatives.

More preferred antioxidants are phosphoric acid, its decomposable salts containing ammonia or amines, 2-ethylhexyl diphenyl phosphate, magnesium glycerophosphate, calcium glycerophosphate, and iron glycerophosphate.

There must be either a colorant in the heat-stable polymer composition or a color enhancer in the antioxidant composition when the antioxidant compound itself does not supply, as part of its decomposition products, a color enhancer.

Some compounds useful as adjuncts to the antioxidant composition can also be antioxidant compounds themselves. Examples of such compounds include liquid carriers, Carbopol ®, a carboxy vinyl polymer sold by B. F. Goodrich Chemical Company; color enhancers, e.g., sugar and starch; and viscosity thickeners provided they are a different heat-stable polymer from that used in the heat-stable polymer composition.

The antioxidant is dissolved or dispersed in suitable carriers for the particular oxidation catalyst.

An antioxidant can also be present within the heat-stable polymer coating composition. The antioxidant of the coating composition can either be the same or different from the antioxidant used in the antioxidant composition.

The oxidation catalyst composition must include an oxidation catalyst and can include viscosity builders or thickeners, wetting agents, inert pigments, decomposable resins and polymer, heat-stable resins and polymers neutralizers, liquid carriers, and other adjuncts.

Polytetrafluoroethylene and other heat-stable polymers are examples of viscosity builders or thickeners. Preferably the same heat-stable polymer utilized in the coating composition is utilized as the viscosity builder or thickener.

Examples of pigment are carbon black, iron oxide, titanium dioxide and cobalt oxide. When pigment is present in the oxidation catalyst composition, at least an equal amount, preferably three to ten times as much, of heat-stable polymer will, preferably, also be present.

The oxidation catalyst composition can contain one or more oxidation catalysts.

An oxidation catalyst is a compound which promotes oxidation under the baking conditions required for fabrication of coated articles. The oxidation catalyst can promote oxidation either itself or through its decomposition or oxidation products. The oxidation catalyst causes the decorative pattern to be rendered visible, upon baking, either by reacting with the components of the coating, or catalyzing reactions within the coating or by adding color itself.

Included in this class of compounds are compounds containing one or more of the following:

| | |
|---|---|
| chromium | manganese |
| copper | bismuth |
| cobalt | cadmium |
| iron | molybdenum |
| nickel | tin |
| vanadium | tungsten |
| tantalum | lithium |
| cerium | sodium |
| thorium | potassium |
| calcium | lead |
| zinc. | |

Preferred compounds are those which are produced by reaction of a metal from the following list (1) with an acid to form a salt compound of list (2).

| (1) Metals | |
|---|---|
| bismuth | lead |
| cerium | manganese |
| cobalt | nickel |
| iron | |
| (2) Salts | |
| acetate | octoate |
| caprate | oleate |
| caprylate | palmitate |
| isodecanoate | ricinoleate |
| linoleate | soyate |
| naphthenate | stearate |
| nitrate | tallate. |

More preferred oxidation catalyst compounds are:
cobalt octoate
cerium octoate
manganese octoate
iron octoate
bismuth octoate
nickel octoate
lead octoate.

An oxidation catalyst can also be present within the heat-stable polymer coating composition. The oxidation catalyst of the coating composition can either be the same or different from the oxidation catalyst used in the oxidation catalyst composition.

The oxidation catalyst is dissolved or dispersed in suitable carriers for the particular oxidation catalyst.

The percentage range by weight of metal content to the total weight of oxidation catalyst plus carrier depends on the oxidation catalyst's formulation and application method. The preferred percentage range is 1-20%, although lower than 1% and higher than 20% concentration can also be used depending on the coating methods and conditions, baking methods and conditions, as well as characteristics of the oxidation catalyst.

The oxidation catalyst composition and the antioxidant composition can be applied by any conventional method of applying ink including methods which cause random placement of ink, e.g., splashing and spattering. Other conventional methods include silk screening and intaglio offset.

The contrast between the area not over or under either the antioxidant composition or the oxidation catalyst composition and the areas over or under either of them is dependent upon the baking temperature and the baking time. If a coated fry pan is baked at a low temperature or a short time, little contrast will be rendered; all areas of the fry pan will remain relatively dark dependent upon the amount of pigment, carbon, antioxidant, and oxidation catalyst present in the coating composition. If a coated fry pan is baked at a high temperature or for a long time, little contrast will be rendered also, all areas of the fry pan will be relatively light dependent upon the amount of pigment, carbon, antioxidant, and oxidation catalyst present in the coating composition.

As an example, if a heat stable polymer composition contained polytetrafluoroethylene, carbon black and an oxidation catalyst, and the baking temperature was 390°-450° C, the baking time which would produce the most contrast would be 3-5 minutes. If the baking time was only 1 minute, the contrast would be less and the coating darker. If the baking time was 15 minutes, the contrast would also be less; however, the coating would be lighter.

As another example, if the heat stable polymer composition contained polytetrafluoroethylene, carbon black, and an antioxidant, and the baking temperature was 390°–450° C, the baking time which would produce the most contrast would be 10–15 minutes.

The baking temperature range of the process is dependent mainly upon which heat-stable polymer composition is utilized.

The process of this invention is utilizable upon any conventionally used substrate. The substrate may be coated with a primer prior to the application of the oxidation catalyst composition. The substrate is preferably pretreated prior to the application of any coating composition. Pretreatment methods include flame-spraying, frit-coating, grit-blasting and acid- or alkali-treating. A metal substrate is preferably pretreated by grit-blasting, by flame-spraying of a metal or a metal oxide, or by frit-coating, although the compositions can be applied successfully to phosphated, chromated or untreated metal. A glass substrate is preferably grit-blasted or frit-coated.

A primer composition, if desired, can be applied either under or over the oxidation catalyst composition and/or the antioxidant composition. The primer composition can be applied in any of the customary ways, which include spraying, roller coating, dipping, and doctor blading. Spraying is generally the method of choice.

The primer composition can be any conventionally used primer composition. An example is the silica-perfluorocarbon primer disclosed by E. J. Welch in U.S. patent application Ser. No. 405,789, filed Oct. 12, 1973.

The coating composition is applied to a thickness of about 0.5–5 mils (dry) and baked for a time and at a temperature sufficient to fuse or cure the heat-stable polymer being used.

Included in the process are various sequences of applying the various compositions, i.e., primer composition, coating composition, oxidation catalyst composition, and antioxidant composition, to the substrate. The components can be applied in any order so long as the application of the primer composition preceeds the application of the coating composition.

The preferred sequences are (1) first the primer composition, then the oxidation catalyst composition, then the antioxidant composition, and then the coating composition; and (2) first the primer composition, then the antioxidant composition, then the oxidation composition, and then the coating composition.

The process of the invention is useful for any article that may use a heat-stable polymer surface; examples are cookware, especially fry pans, bearings, valves, wire, metal foil, boilers, pipes, ship bottoms, oven liners, iron soleplates, waffle irons, ice cube trays, snow shovels, saws, files and drills, hoppers and other industrial containers and molds.

The following examples are illustrative of the invention. All parts are on a weight basis unless otherwise stated.

EXAMPLE 1

An aluminum fry pan panel is grit-blasted with 80 mesh alumina grit at 5.62 kgs/cm² (kilograms per square centimeter) and then frit coated with CN 500A frit sold by the Ferro Company.

A silica-fluorocarbon primer is prepared as follows:

|  | Parts by Weight |
|---|---|
| (a) Mix together | |

| | Parts by Weight |
|---|---|
| polytetrafluoroethylene (PTFE) aqueous-dispersion, 60% solids | 477.92 parts |
| colloidal silica sol, 30% solids in water ("Ludox AM" in colloidal silica, sold by E. I. du Pont de Nemours and Company) | 329.28 parts |
| (b) Separately mix | |
| Triethanolamine | 3.81 parts |
| Oleic Acid | 1.86 parts |
| toluene | 35.20 parts |
| butyl carbitol (diethylene glycol monobutyl ether acetate) | 30.40 parts |
| silicone solution (Dow Corning DC-805 silicone 50% solids in xylene) | 28.72 parts |

89.06 parts of (b) are added to (a) in a small stream, with stirring, over a 2–3 minute period. To this are added, with stirring, 270.74 parts by weight of the following pigment dispersion:

| titanium dioxide | 44% |
|---|---|
| triethanolamine | 8% |
| oleic acid | 4% |
| water | 44% |

Stirring is continued for 10–20 minutes.

The primer is sprayed onto the frit-coated aluminum fry pan to a thickness of 0.3 mils (dry) and is dried in air.

An oxidation catalyst composition is prepared consisting of

50% cerium octoate in 2-ethyl hexanoic acid (12% metal content by weight)

50% cobalt octoate in mineral spirits (12% metal content by weight)

An antioxidant composition is prepared consisting of

| phosphoric acid (85%) | 1 part by weight |
|---|---|
| triethanolamine | 5 parts by weight |

The oxidation catalyst composition is stamped upon the fry pan in a configuration of a circle with a hollow center.

The antioxidant composition is stamped upon the fry pan in a configuration of a hollow centered circle. This circle is coaxial with but does not overlap the circle formed by the oxidation catalyst composition.

A fluorocarbon coating composition is prepared as follows:

a. Prepare a mill base by mixing in order and pebble milling:

| | Parts by Weight |
|---|---|
| titanium dioxide | 360.00 parts |
| triethanolamine | 53.28 parts |
| oleic acid | 26.72 parts |
| deionized water | 360.00 parts. | b. With mixing, add 97.89 parts by weight of the product of (a) to 718.04 parts by weight of PTFE dispersion ("Du Pont TE-30").

c. Mix:

| triethanolamine | 26.76 parts |
|---|---|

| | |
|---|---|
| oleic acid | 16.68 parts |
| toluene | 56.04 parts |
| butyl carbitol | 18.79 parts | d. Slowly add the product of (c) to the product of (b) with mixing.

e. Slowly add, with mixing, 125.8 parts by weight of an aqueous dispersion, 40% solids, of a methyl methacrylate/ethyl acrylate/methacrylic acid polymer having a monomer weight ratio of 39/57/4 to the product of (d).

f. Slowly add, with mixing, 39.3 parts by weight water to the product of (d).

A sufficient amount of the coating composition is sprayed onto the fry pan to obtain a coating having a thickness of 0.7 mil (dry) and then is dried in air.

The air dried fry pan is baked at 430° C for five minutes.

The coating on the fry pan would be brownish, except for the area over which oxidation catalyst composition is stamped would be whitish, and the area over which the antioxidant composition is stamped would be darker brown.

EXAMPLE 2

Prepare a coating composition as follows:

a. Add slowly, with stirring, 31.50 parts by weight of an aqueous dispersion, 40% solids, of a methyl methacrylate/ethyl acrylate/methacrylic acid terpolymer having monomer weight ratios of 39/57/4 to 143.6 parts by weight of an aqueous dispersion of 60% by weight polytetrafluoroethylene, containing 6% by weight isooctylphenoxypolyethoxyethanol.

b. Add slowly, with stirring, to the product of (a), 2.0 parts by weight of a black mill base consisting of:

| | |
|---|---|
| carbon | 20% by weight |
| aluminosilicate pigment | 10% by weight |
| sodium polynaphthalene sulfonate | 3% by weight |
| water | 67% by weight. | c. Add slowly, with stirring, to the product of (b), 5.3 parts by weight of a complementary mill base consisting of:

| | |
|---|---|
| titanium dioxide | 45 parts by weight |
| deionized water | 54.5 parts by weight |
| sodium polynaphthalene sulfonate | .5 parts by weight. | d. Add slowly, with stirring, to the product of (c), 25.7 parts by weight of a solvent-surfactant-oxidation catalyst solution prepared as follows:

| mix together in order | |
|---|---|
| triethanolamine | 5.5 parts by weight |
| oleic acid | 3.3 parts by weight |
| toluene | 11.1 parts by weight |
| butyl carbitol | 3.8 parts by weight |
| cerium octoate (12% metal content by weight in 2-ethyl hexanoic acid) | 1.5 parts by weight |
| cobalt octoate (12% metal content by weight in mineral spirits) | 0.5 parts by weight |

Prepare an aluminum fry pan by grit-blasting, frit-coating and priming according to the directions in Example 1.

Prepare an antioxidant composition consisting of:

| | |
|---|---|
| phosphoric acid (85%) | 1 part by weight |
| triethanolamine | 5 parts by weight |
| deionized water | 194 parts by weight |

Prepare an oxidation catalyst composition consisting of

| | |
|---|---|
| cobalt octoate (18% metal content by weight) | .2 parts |
| cerium octoate (24% metal content by weight) | .5 parts |
| toluene | 99.2 parts |

Spatter the antioxidant composition onto the fry pan.

Spatter the oxidation catalyst composition onto the fry pan.

Spray a sufficient amount of the coating composition produced by (d) onto the aluminum panel to obtain a coating having a thickness of 0.7 mil (dry).

Dry the coated fry pan in air.

Place the air-dried fry pan into an oven at 430° C. When the temperature of the fry pan has been 430° C for 5 minutes, remove the fry pan.

The coating on the fry pan would be grey, except the area over the spattered antioxidant composition which would be dark grey, and the area over the spattered oxidation catalyst composition would be white.

EXAMPLE 3

Prepare a coating composition as follows:

| | |
|---|---|
| (a) Prepare a white mill base consisting of: | |
| titanium dioxide | 360 |
| triethanolamine | 53.28 |
| oleic acid | 26.72 |
| deionized water | 360 |
| (b) Prepare a black mill base consisting of: | |
| channel black | 20 |
| aluminasilicate extender | 10 |
| sodium polynaphthalene sulfonate | 3 |
| deionized water | 67 |
| (c) Prepare a solvent-surfactant solution consisting of: | |
| triethanolamine | 25.91 |
| oleic acid | 12.21 |
| toluene | 46.25 |
| butyl carbitol | 15.63 | d. Add slowly, with stirring, 101.33 parts by weight of the white mill base of (a) to 711.35 parts by weight of an aqueous dispersion of 60% by weight polytetrafluoroethylene, containing 6% by weight isooctyl phenoxypolyethoxyethanol.

e. Add slowly, with stirring, to the product of (a) 21.00 parts by weight of the black mill base of (b).

f. Add slowly, with stirring, to the product of (e) 48.00 parts by weight of the solventsurfactant solution of (c).

g. Add slowly, with stirring, to the product of (f) 135.88 parts by weight of an aqueous dispersion, 40% solids, of a methyl methacrylate/ethyl acrylate/methacrylic acid terpolymer having a monomer weight ratio of 39/57/4.

h. Prepare and add slowly, with stirring, to the product of (g) the following composition:

| | |
|---|---|
| phosphoric acid (85%) | 1 part |
| triethanolamine | 5 parts |
| deionized water | 94.0 parts |

Prepare an aluminum fry pan by grit-blasting, frit-coating, and priming according to the directions in Example 1.

Prepare an antioxidant composition consisting of:

| | |
|---|---|
| phosphoric acid (85%) | 1 part by weight |
| triethanolamine | 5 parts by weight |
| deionized water | 194 parts by weight |

Prepare an oxidation catalyst composition consisting of:

| | |
|---|---|
| cobalt octoate (18% metal content) | .2 parts |
| cerium octoate (24% metal content) | .5 parts |
| toluene | 99.3 parts |

Spatter the antioxidant composition onto the fry pan.
Spatter the oxidation catalyst composition onto the fry pan.
Spray a sufficient amount of the coating composition of (h) onto the aluminum fry pan to obtain a coating having a thickness of 0.7 mil (dry).
Dry the coated fry pan in air.
Place the air dried fry pan into an oven at 430° C. When the temperature of the fry pan has been 430° C for 13 minutes, remove the fry pan from the oven.
The coating on the fry pan would be grey except for the area over the spattered antioxidant composition which would be darker grey to black and the area over the spattered oxidation which would be lighter grey to white.

What is claimed is:

1. A process for decorating a heat-stable polymer coating on a substrate, the process consisting essentially of applying a heat-stable polymer composition which is stable at temperatures above 300° C either as a subsequent coat over or directly under or between an antioxidant composition and an oxidation catalyst composition which are both arranged in decorative patterns on a substrate and then baking the coating wherein the antioxidant or its decomposition product and the oxidation catalyst or its decomposition products diffuse into the coating and either by reacting with components of the coating, by catalyzing or hindering reactions within the coating or by themself render, upon baking, the decorative pattern visible within the heat-stable polymer coatings wherein the heat-stable polymer composition comprising:
   a. a heat-stable polymer, said polymer being silicone, polysulfide, polymerized parahydroxy benzoic acid, polysulfone, polyimide, polyamide, polysulfonate, polysulfonamide, fluorocarbons, or mixtures of the above,
   b. a liquid carrier,
   c. optionally a colorant;
wherein the oxidation catalyst is a compound or mixture of compounds produced by reaction of a metal from list (1) with an acid to form a salt compound of list (2):

| (1) Metals | |
|---|---|
| | Cobalt | Bismuth |
| | Cerium | Nickel |
| | Manganese | Lead |
| | Iron | |
| (2) Salts | | |
| | Acetate | Octoate |
| | Caprate | Oleate |
| | Caprylate | Palmintate |
| | Isodecanoate | Ricinoleate |
| | Linoleate | Soyate |
| | Naphthenate | Stearate |
| | Nitrate | Tallate. |

2. The process of claim 1 wherein the antioxidant composition contains a compound or mixture of compounds containing phosphorus, sulfur, boron or mixtures thereof.

3. The process of claim 1 wherein the antioxidant is phosphoric acid, its decomposable salts containing ammonia or amines, 2-ethylhexyl diphenyl phosphate, magnesium glycerophosphate, calcium glycerophosphate, iron glycerophosphate or mixtures thereof; and the heat-stable polymer composition is further comprised of a colorant.

4. The process of claim 1 wherein the heat-stable polymer is a fluorocarbon.

5. The process of claim 1 wherein the heat-stable polymer is a hydrocarbon monomer completely sbustituted with fluorine atoms or a combination of fluorine atoms and chlorine atoms.

6. The process of claim 1 wherein the heat-stable polymer is polytetrafluoroethylene, a copolymer of tetrafluoroethylene and hexafluoropropylene or mixtures thereof.

7. The process of claim 1 wherein the heat-stable polymer composition contains a colorant.

8. The process of claim 7 wherein the colorant is carbon black, a carbonaceous residue, a carbonaceous residue precursor or mixture thereof, in concentrations up to 40% based on the weight of total solids of the composition.

9. The process of claim 1 wherein the oxidation catalyst composition contains a mixture of a compound containing cerium and a compound containing cobalt.

10. The process of claim 1 wherein the oxidation catalyst is:
   Cobalt octoate
   Cerium octoate
   Manganese octoate
   Iron octoate
   Bismuth octoate
   Nickel octoate
or
   Lead octoate.

11. The process of claim 1 wherein the heat-stable polymer composition is applied as a subsequent coat over the antioxidant composition and the oxidation catalyst composition.

12. The process of claim 1 wherein the heat-stable polymer composition is applied directly under the antioxidant composition and the oxidation catalyst composition.

13. The process of claim 1 wherein the heat-stable polymer composition is applied between the antioxidant composition and the oxidation catalyst composition.

14. The process of claim 1 in which the heat-stable polymer is present in the heat-stable polymer composition at a concentration of at least 25% by weight of the total solids of the composition.

15. The process of claim 1 in which the heat-stable polymer is present in the heat-stable polymer composition at a concentration in the range of 25% to 95% of the total solids of the composition.

16. The process of claim 1 in which the heat-stable polymer is present in the heat-stable polymer composition at a concentration in the range of 70% to 90% of the total solids of the composition.

17. An article bearing a decorative pattern coating produced by the process of claim 1.

* * * * *